(12) United States Patent
Korenaga et al.

(10) Patent No.: US 6,445,857 B1
(45) Date of Patent: Sep. 3, 2002

(54) OPTICAL WAVEGUIDE PART, ITS MANUFACTURING METHOD, CONNECTION MEMBER, OPTICAL PART, METHOD FOR CONNECTING OPTICAL WAVEGUIDE PART, AND OPTICAL ELEMENT

(75) Inventors: Tsuguhiro Korenaga, Katano; Hiroyuki Asakura, Osaka; Mikihiro Shimada, Kadoma; Masanori Iida, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 09/662,874

(22) Filed: Sep. 15, 2000

(30) Foreign Application Priority Data

Sep. 21, 1999 (JP) .............................................. 11-267788
May 30, 2000 (JP) ........................................ 2000-159522

(51) Int. Cl.$^7$ .................................................. G02B 6/42
(52) U.S. Cl. ......................................... 385/52; 285/129
(58) Field of Search ............................... 385/52, 49, 14, 385/51, 83, 88, 92, 129, 131, 132; 372/45, 50, 46

(56) References Cited

U.S. PATENT DOCUMENTS 6,314,228 B1 * 11/2001 Korenaga et al. ........... 385/129

* cited by examiner

Primary Examiner—Phan T. H. Palmer
(74) Attorney, Agent, or Firm—Smith, Gambrell & Russell, LLP

(57) ABSTRACT

An optical waveguide part has, wherein a plurality of optical members each having an optical waveguide groove are installed on a substrate with a fixing groove for fixing an optical fiber in such a:manner that said optical waveguide grooves,are connected together, an optical element is located between the plurality of optical members with said optical waveguide groove, and a recess of each of said optical waveguide grooves is filled with a material having a higher refractive index than said substrate and said optical member.

20 Claims, 17 Drawing Sheets

Fig. 1 (a)
FORM OPTICAL WAVEGUIDE GROOVE AND ALIGNMENT MARKERS ON OPTICAL MEMBER SURFACE

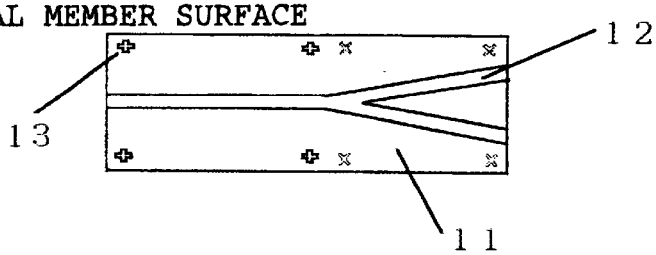

Fig. 1 (b)
CUT  CUT

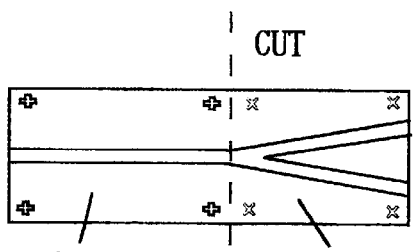

Fig. 1 (c)
BOND ONE OF OPTICAL MEMBERS OBTAINED BY CUTTING, TO BASE SUBSTRATE (UV RESIN IS USED TO CARRY OUT BONDING WHILE SIMULTANEOUSLY FORMING OPTICAL WAVEGUIDE)
INVERT OPTICAL MEMBER AND BOND IT TO BASE SUBSTRATE ON GROOVE FORMED SURFACE

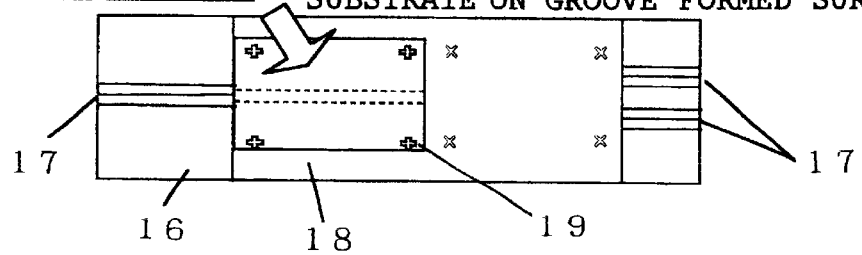

Fig. 1 (d) COAT THIN-FILM WAVELENGTH FILTER ON CUT SURFACE

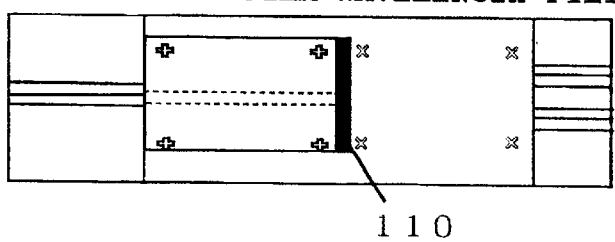

Fig. 1 (e) PERFORM SIMILAR OPERATION TO BOND THE OTHER OPTICAL MEMBER

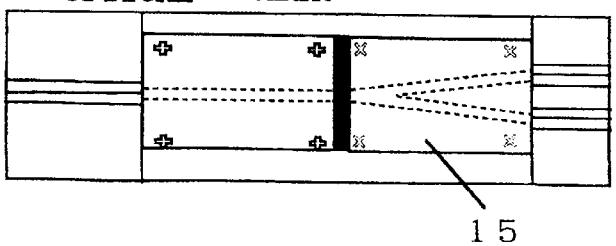

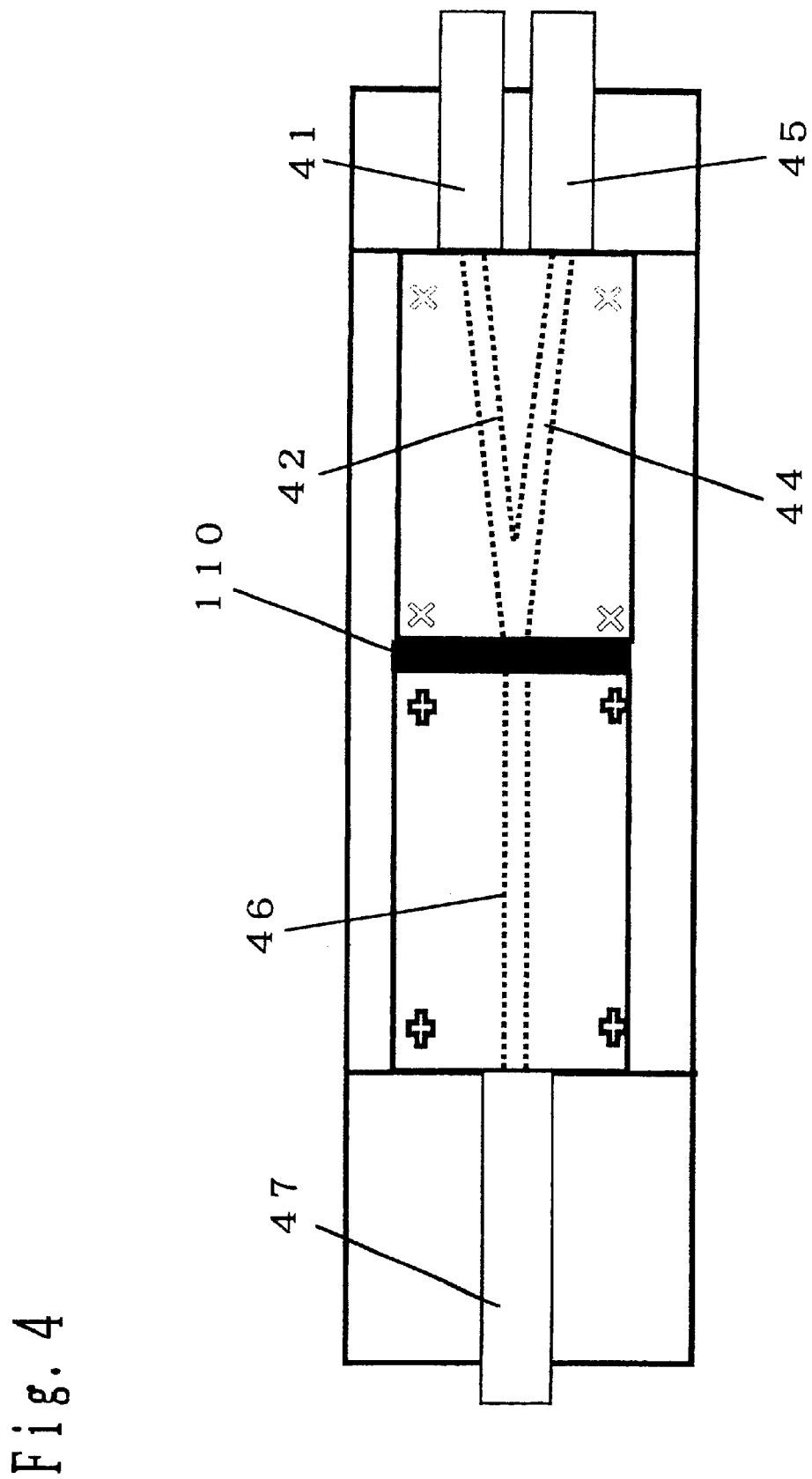

Fig. 5 (a)
FORM OPTICAL WAVEGUIDE GROOVE AND ALIGNMENT MARKERS ON OPTICAL MEMBER SURFACE

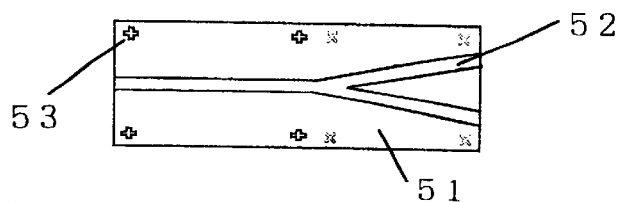

Fig. 5 (b)
CUT       CUT

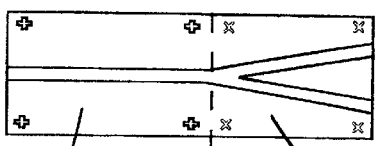

Fig. 5 (c)
BOND ONE OF OPTICAL MEMBERS OBTAINED BY CUTTING, TO BASE SUBSTRATE

INVERT OPTICAL MEMBER AND BOND IT TO BASE SUBSTRATE ON GROOVE FORMED SURFACE

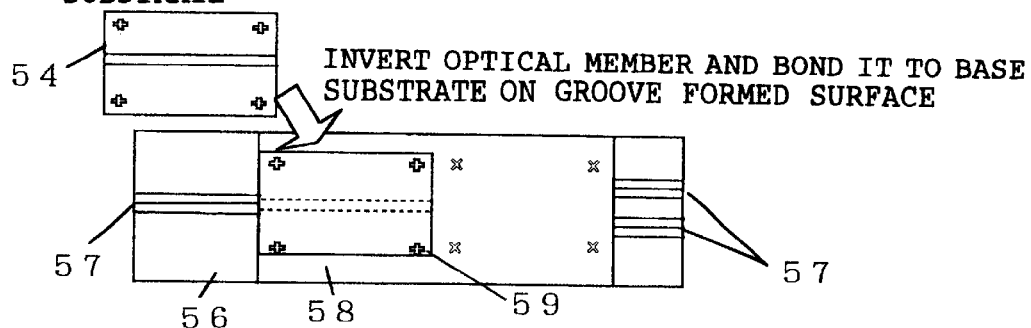

Fig. 5 (d)
FILL OPTICAL WAVEGUIDE GROOVE WITH RESIN AND SOLIDIFY RESIN

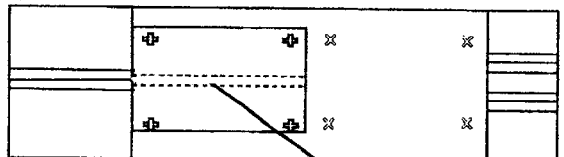

Fig. 5 (e) COAT THIN-FILM WAVELENGTH FILTER ON CUT SURFACE

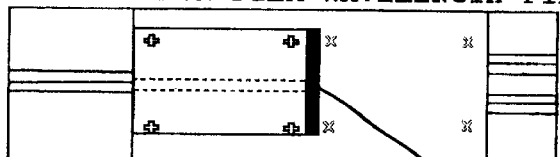

Fig. 5 (f) PERFORM SIMILAR OPERATION TO BOND THE OTHER OPTICAL MEMBER

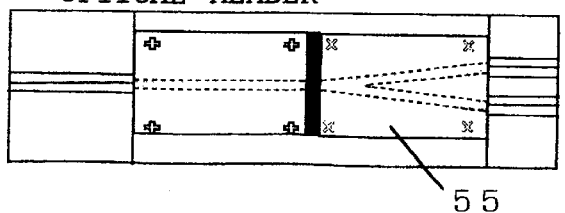

Fig. 7 (a) (Prior Art)
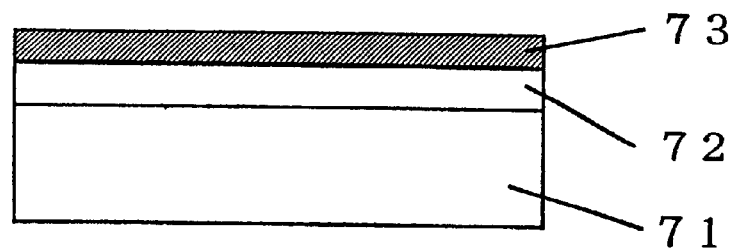
Fig. 7 (b) (Prior Art)
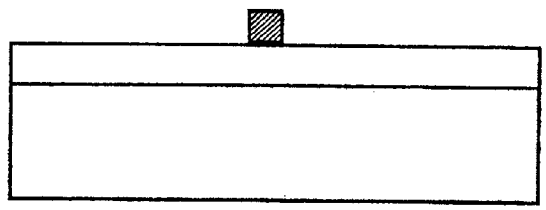
Fig. 7 (c) (Prior Art)
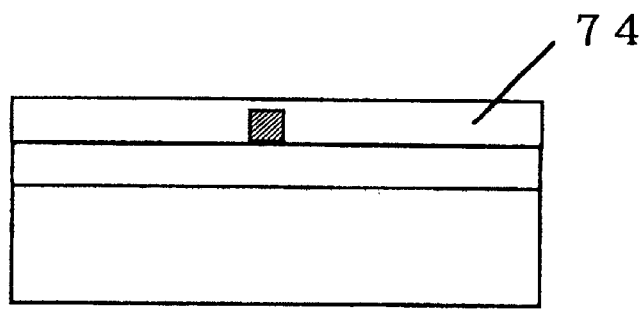

OPTICAL WAVEGUIDE PART, ITS MANUFACTURING METHOD, CONNECTION MEMBER, OPTICAL PART, METHOD FOR CONNECTING OPTICAL WAVEGUIDE PART, AND OPTICAL ELEMENT

BACKGROUND OF THE INVENTION

1. Field of the Invention

The present invention principally relates to an optical waveguide component for use in optical communications and its manufacturing method.

2. Related art of the Invention

Optical communication systems using optical communications with a wide band characteristic and additionally having functions such as wavelength multiplexing transmission or bidirectional transmission are spreading among public communications, computer networks, or the like in order to obtain high speed and advanced function.

The optical communication systems are developing from a trunk line type to a subscriber type for general homes and offices. The homes and offices each require an optical network unit (ONU); an optical module is essential, which converts optical signals from a station into electric signals and receive them and which converts an electrical signal sent from the subscriber into an optical signals to transmit it to an optical fiber. Costs of the optical module must be lowered in order to diffuse optical fibers to the subscriber-type optical communication systems.

The wavelength division multiplexing method (WDM) is expected to allow optical fibers to be efficiently used to transmit more information. This method allows optical signals of multiple wavelengths to be transmitted through a single optical fiber to increase the amount of transmitted information in proportion to the number of wavelengths.

In dosing so, an optical module in each home requires a function to divide wavelengths.

FIG. 6 shows the configuration of an optical module for a general WDM. Main components of this module are an optical waveguide formed on Si substrate, an interference filter (a wavelength filter), a transmitting laser diode (LD), and a photodiode (PD) for reception or LD optical power monitoring.

The optical waveguide comprises a core embedded in a clad and having a relatively higher refractive index than peripheries thereof. Light propagates while being confined in the core of a high refractive index. By patterning the core into a circuit, functions such as branching and synthesis of light can be implemented.

In FIG. 6, light of wavelength 1.3 $\mu$m and light of wavelength 1.55 $\mu$m both from a station are multiplexed before transmission and then input to the optical module through a common port 67. The light of wavelength 1.3 $\mu$m is used for bidirectional communications between the station and the subscriber, while the light of wavelength 1.55 $\mu$m is used only for signal from the station to the subscriber. After these lights have passed through the optical waveguide, the light of wavelength 1.55 $\mu$m is reflected by an interference filter 62 to leave the module through a port 2 (68), whereas the light of wavelength 1.3 $\mu$m passes through a filter 62 and is then branched, so that a portion thereof is received by the receiving PD64 and converted into an electric signal.

On the other hand, for transmission, the LD63 is driven so as to be modulated to transmit an optical signal to the station through the common port 67.

Although such a conventional module is obtained by combining together a large number of parts such as lenses and prisms and accurately positioning them for assembly, the use of the optical waveguide as in the optical module in FIG. 6 can reduce the number of required part while diminishing the size of the module through assembly.

The module in FIG. 6, however, has the following problems in terms of costs and productivity:

One of the problems is high costs of the optical waveguide. FIG. 7 shows a procedure for manufacturing a general optical waveguide.

(a) A lower clad film 72 is formed on a silicon substrate 71 (film thickness: 20 $\mu$m or larger). A core film 73 is formed thereon (about 10 $\mu$m).

(b) The core film is formed in a predetermined pattern using photolithography or dry etching.

(c) Finally, an upper clad layer 74 is formed (film thickness: 20 $\mu$m or larger).

In this manner, the thin films are deposited on the substrate 71 in the order of the lower clad, the core, and the upper clad. Processes for forming the thin films may include the flame deposition method, the CVD method, and the vacuum evaporation method. Since, however, the optical waveguide requires a large total thickness of about 50 $\mu$m and must meet severe specifications as for film thickness accuracy, it requires a long tact time whatever process is used, resulting in insufficient productivity.

In addition, the patterning is required after the core film has been formed but uses a semiconductor process such as photolithography or dry etching, which requires expensive facilities and a long tact time. This process is thus unsuitable for mass production and does not allow costs to be reduced easily.

Another problem is the need to integrate the interference filter.

As shown in FIG. 6, the interference filter 62 has an important function for mutually separating wavelengths. The interference filter comprises a multilayer dielectric oxide film formed on a polyimide and is generally obtained by forming a groove in a substrate beforehand by means of dicing and inserting a filmed polyimide into the groove for adhesion and fixation.

Although the interference filter inherently has a high wavelength selectivity (isolation ratio), its performance varies due to various factors originating from the insertion and assembly of the polyimide into the groove. For example, FIG. 8 shows a polyimide substrate 81 inserted into a groove 83 as seen from above. The warpage or inclination of the polyimide substrate 81 inside the groove 83 slightly varies. an incident angle with respect to the filter, the position of reflected light, or the like, thereby varying a wavelength separation performance and transmission losses. The positional accuracy achieved when the groove is formed contributes to varying optical power obtained after light has passed through the filter. Reference numeral 82 denotes an optical waveguide and reference numeral 84 denotes an adhesive.

Accordingly, reducing such variations requires a very accurate assembly process, thereby unavoidably elongating the tact time and increasing facility costs. As a result, the current interference filter is unsuitable for mass production and does not allow costs to be reduced easily.

An optical module is also known which is obtained by cutting the optical waveguide at a predetermined position, interposing a wavelength filter at the cut position, and coupling the cut portions of the waveguide together again.

However, this module also requires a positional accuracy of ±1$\mu$ in reconnecting the cut portions of the optical waveguide. The position seems to be adjusted based on an outer diameter because the integral object is cut, but cut edges that may occur upon cutting may prevent the required accurate positioning despite the positioning based on the outer dimensions of the optical waveguide.

SUMMARY OF THE INVENTION

In view of the conventional problems, it is an object thereof to provide an optical waveguide part that enables the size and costs of an optical module to be easily reduced and a method for manufacturing this optical waveguide part.

Means for attaining,this object is shown below.

The $1^{st}$ invention of the present invention is an optical waveguide part, wherein a plurality of optical members each having an optical waveguide groove are installed on a substrate with a fixing groove for fixing an optical fiber in such a manner that said optical waveguide grooves are connected together, an optical element is located between the plurality of optical members with said optical waveguide groove, and a recess of each of said optical waveguide grooves is filled with a material having a higher refractive index than said substrate and said optical member.

In this configuration, the substrate with the optical fiber-fixing groove functions as a lower clad. The plurality of optical members with the optical waveguide grooves function as an upper clad. In addition, the material placed in the groove functions as a core. When input from an end surface of the groove, light is confined in the groove if it meets specific conditions.

The optical waveguide part configured as described above does not require thin films to be deposited as in the prior art, thereby improving productivity. In addition, the optical fiber and the optical waveguide can be coupled together easily by placing the optical fiber in the fixing groove in the substrate also acting as the lower clad. Additionally, in this configuration, the optical waveguide grooves formed in the plurality of optical members are continuous, thereby enabling an optical element to be provided in a boundary portion between the optical members. The optical element is obtained by directly bonding the element on a substrate to the optical member or directly coating a thin film on an end surface of the optical member.

This configuration enables integration of any optical elements including wavelength filters, isolators, wavelength plates, and various mirrors.

This configuration also eliminates the needs for the groove into which the optical element is inserted as required in the prior art. Consequently, it can lower machining costs and substantially reduce variations in performance stemming from errors in integrating the optical element into the module.

The optical waveguide part according to the present invention is therefore advantageous in terms of costs and productivity.

The $2^{nd}$ invention of the present invention is a process for manufacturing an optical waveguide part, comprising:

a first step of forming on a substrate a fixing groove for fixing an optical fiber and a first, second, . . . n-th (n is an integer of two or larger) optical waveguide grooves on a first, second, . . . n-th optical members, respectively;

a second step of coating a resin on said first optical member or said substrate, bonding said first optical member to said substrate on a surface thereof with said first optical waveguide groove formed therein, and hardening said resin;

a third step of additionally forming another optical element on an end surface of said first optical member; and a fourth step of coating a resin on said second optical member or said substrate, bonding said second optical member to said substrate on a surface thereof with said second optical waveguide groove formed therein in a manner such that said first and second optical waveguide grooves are connected together, and hardening said resin, wherein said third and fourth steps are also carried out on said third, . . . n-th optical members, respectively.

According to the present manufacturing method, the optical fiber-fixing groove and the optical waveguide groove in each optical member are produced, for example, by means of molding with a mold. Repeated molding with the same mold enables the mass production of optical members with the same groove pattern.

Alternatively, by coating a resin on an optical member or a substrate, bonding the optical member to the substrate on its groove pattern surface, and hardening the resin, the resin in the groove forms an optical waveguide core and bonds the optical member and the substrate together.

Each optical member and the substrate can be easily positioned with an accuracy of ±1$\mu$ using an alignment marker. The alignment marker can also be formed during the molding process.

In this manner, the optical waveguide part can be manufactured very easily. This manufacturing method comprises manufacturing the optical waveguide part by assembling the plurality of optical members on the base substrate with the fixing groove for the optical fiber; by directly forming a thin film in an interface between optical members, a large amount of parts with a wavelength separating function can be inexpensively manufactured.

The $3^{rd}$ invention of the present invention is a process for manufacturing an optical waveguide part, comprising:

a first step of forming on a substrate a fixing groove for fixing an optical fiber and a first, second, . . . n-th (n is an integer of two or larger) optical waveguide grooves on a first, second, . . . n-th optical members, respectively;

a second step of directly joining said first optical member to said substrate on a surface thereof with said first optical waveguide groove formed therein;

a third step of filling said first optical waveguide groove with a core material;

a fourth step of additionally forming an optical element on an end surface of said first optical member;

a fifth step of directly joining said second optical member to said substrate on a surface thereof with said second optical waveguide groove formed therein in a manner such that said first and second optical waveguide grooves are connected together; and a sixth step of filling said second optical waveguide groove with a core material, wherein said fourth to sixth steps are also carried out on said third, . . . n-th optical members, respectively.

According to the present method for manufacturing the direct coupling is used to firmly bond the each optical member and the base substrate together, thereby substantially increasing mechanical strength.

The $4^{th}$ invention of the present invention is the optical waveguide part wherein an optical waveguide groove is formed on a substrate, and recesses or projections for positioning are formed on a surface of said substrate at predetermined positions.

The 5<sup>th</sup> invention of the present invention is the optical waveguide part according to the 4<sup>th</sup> invention, wherein said recesses or projections are formed on a surface of said substrate which does not have said optical waveguide groove formed therein.

The 6<sup>th</sup> invention of the present invention is the optical waveguide part according to the 4<sup>th</sup> or 5<sup>th</sup> inventions, wherein said optical waveguide groove and said recesses or said projections are formed at one step by using a mold having projections or recesses on its surface.

The 7<sup>th</sup> invention of the present invention is a method for manufacturing an optical waveguide part comprising an optical waveguide groove on a substrate and recesses or projections for positioning formed on an end surface of said substrate, wherein:

an optical waveguide part material comprising the optical waveguide groove formed on a material substrate and recessed shapes or projected shapes formed on a surface of said material substrate has said recessed shape portions or said projected shape portions cut to manufacture said optical waveguide part.

The 8<sup>th</sup> invention of the present invention is a connection member for use in connecting together two optical waveguide parts according to any one of the 4<sup>th</sup> to 6<sup>th</sup> inventions.

The 9<sup>th</sup> invention of the present invention is the connection member according to the 8<sup>th</sup> invention, comprising a predetermined plate section having projections or recesses for connection that fit said recesses or projections on each of said two optical waveguide parts.

The 10<sup>th</sup> invention of the present invention is an optical part for connection together two optical waveguide parts according to any one of the 4<sup>th</sup> to 6<sup>th</sup> inventions, wherein:

said two optical waveguide parts each has said recesses formed in a site corresponding to an end surface of said substrate and having said optical waveguide groove formed therein, and said optical part is fitted in said recesses formed in said end surface sections of said two optical waveguide part.

The 11<sup>th</sup> invention of the present invention is a method for connecting an optical waveguide part, wherein a connection member according to any one of the 4<sup>th</sup> to 6<sup>th</sup> inventions is used to connect together two optical waveguide parts according to claim 9 or 10 in a manner such that said optical waveguide grooves of said two optical waveguide parts are connected together.

The 12<sup>th</sup> invention of the present invention is a method for connecting an optical waveguide part, wherein an optical part according to any one of the 4<sup>th</sup> to 6<sup>th</sup> inventions is used to connect together two optical waveguide parts according to the 10<sup>th</sup> invention in a manner such that said optical waveguide grooves of said two optical waveguide parts are connected together.

The 13<sup>th</sup> invention of the present invention is an optical element comprising two optical waveguide parts according to any one of the 4<sup>th</sup> to 6<sup>th</sup> inventions connected together.

The 14<sup>th</sup> invention of the present inventions is the optical element according to the 13<sup>th</sup> invention, comprising an optical part located between said optical waveguide grooves of said two optical waveguide parts to optically connect said optical waveguide grooves of said two optical waveguide parts together.

The 15<sup>th</sup> invention of the present invention is the optical element according to the 13<sup>th</sup> invention, comprising an optical part located between said optical waveguide grooves of said two optical waveguide parts.

BRIEF DESCRIPTION OF THE DRAWINGS

FIGS. 1a–1e are views showing a procedure for manufacturing an optical waveguide part according to Embodiment 1 of the present invention;

FIG. 4 is a view showing the optical waveguide part according to Embodiment 1 of the present invention with fibers set thereon, as seen from above;

FIGS. 5a–5f are views showing a procedure for manufacturing an optical waveguide part according to Embodiment 2 of the present invention;

FIGS. 7a–7c are views showing a procedure for manufacturing a conventional optical waveguide;

Figure 2:
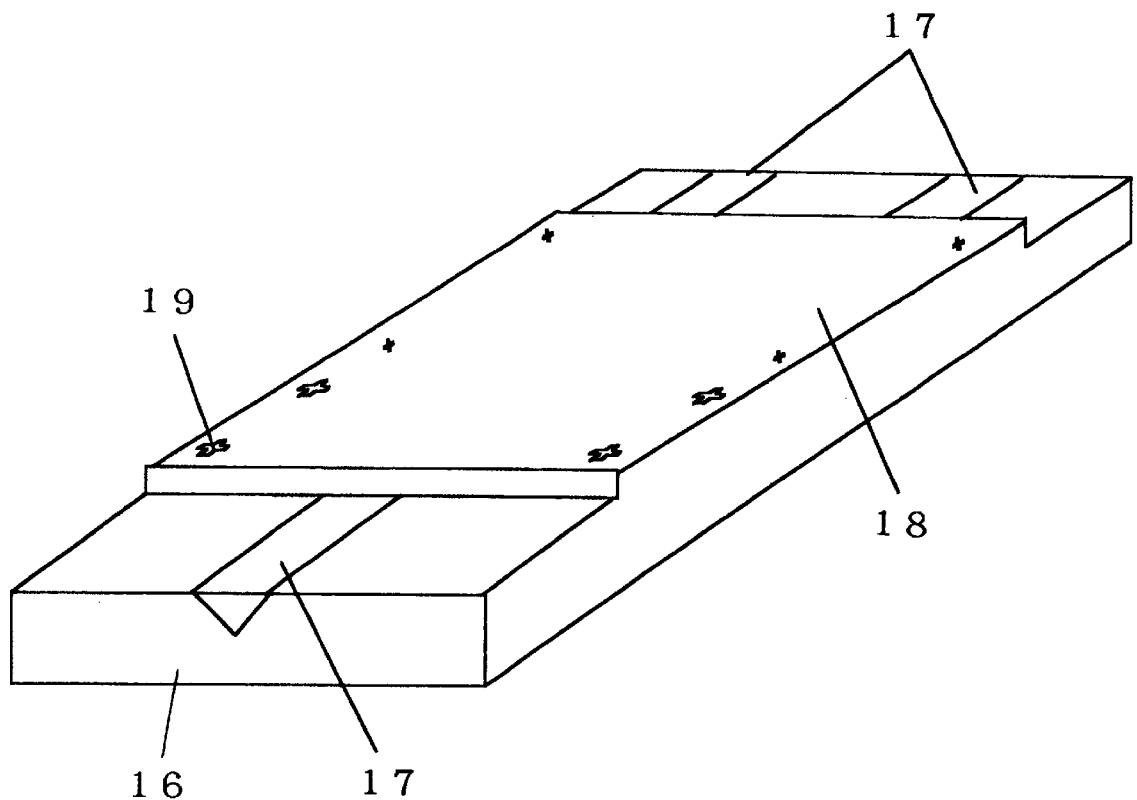
FIG. 2 is a view showing a base substrate of the optical waveguide part according to Embodiment 1 of the present invention.

DESCRIPTION OF SYMBOLS 11, 51 Optical members
12, 52 Groove-shaped waveguide pattern
13, 19, 21, 53 Alignment markers
14, 32, 54 First optical members
15, 33, 55 Second optical members
16, 31, 56 Base substrates
17, 23, 35, 36, 57 V-shaped grooves
18, 22, 58 Flat stages
110, 34, 43, 511 Thin-film wavelength filters
37 Optical waveguide groove (filled with UV resin)
41 Optical fiber
42 44, 46, 61, 82 Optical waveguides
62 Interference filter
63 Laser (LD)
64 Photodiode (PD)
65 Power monitor PD 66, 71 Si substrates
67 Common port
68 Port 2
72 Lower clad film
73 Core film
74 Upper clad film
81 Polyimide film with interference filter
83 Groove
84 Adhesive
211, 221, 231, 241, 251, 261, 271 Substrates
212, 222, 232, 242, 252, 262, 266, 269, 272, 276, 279 Optical waveguide grooves
213, 223, 233, 243, 253,. 263 Recesses
214, 264 Pins
234, 244 Projections
255, 265 Optical part
217, 227, 237, 247, 257, 267 First optical waveguide part
218, 228, 238, 248, 258, 268 Second optical waveguide part

PREFERRED EMBODIMENTS OF THE INVENTION

Embodiment 1

A method for manufacturing an optical waveguide part according to Embodiment 1 of the present invention will be described with reference to FIG. 1.

As shown in FIG. 1(A), a groove-shaped optical waveguide pattern 12 and a number of alignment markers 13 are formed on a surface of an optical member 11 comprising a glass or a transparent resin.

Next, the optical member is cut in a fashion traversing the optical waveguide pattern 12 as shown in FIG. 1(B). This divides the optical member into a first optical member 14 and a second optical member 15. An optical element such as a wavelength filter, a mirror, or a wavelength plate is located at this cut position.

On the other hand, a fiber-fixing V-shaped groove 17, a flat stage 18 on which an optical member is installed, and a number of alignment markers 19 are similarly formed on a surface of a base substrate 16 comprising glass or a transparent resin. FIG. 2 shows the shape of the base substrate. These alignment markers correspond to the alignment markers 13 on the previously described optical member 11; one of the two sets of alignment markers are recesses, while the others are corresponding projections.

Next, as shown in FIG. 1(c), a UV resin is coated on a surface of the first optical member 14 on which a groove-shaped optical waveguide pattern is to be formed in such a manner that the interior of the groove is filled with the resin. The first optical member is then attached to the base substrate 16 using the alignment markers 13, 19. Subsequently, an ultraviolet ray is applied to bond and fix the base substrate 16 and the first optical member 14 together, while the UV resin in the groove is hardened. When the UV resin has a higher refractive index than the base substrate 16 and the first and second optical members 14 and 15, the UV resin in the groove functions as an optical waveguide core.

Next, a shown in FIG. 1(d), a thin-film formation process is used to form an optical thin film such as a thin-film wavelength filter 110 or a reflection mirror on the cut surface of the first optical member 14. The film material maybe metal but a dielectric material such as $TiO_2$ or $SiO_2$ is preferably formed into multiple layers because the resulting transmission loss is small. In addition, the thin-film formation process is desirably evaporation, which does not damage the UV resin. Ion assist evaporation is particularly desirable because it can form reliable optical thin films with excellent characteristics.

Finally, as shown in FIG. 1(e), the second optical member 15, similarly to the first optical member 14, has its optical waveguide groove filled with the UV resin, and is then bonded to the base substrate 15 to complete the optical waveguide part. The second optical member 15 can be accurately positioned on the base substrate 16 using the alignment markers formed by means of molding.

Thus, the optical waveguide groove pattern 12 formed on the first optical member 14 and the optical waveguide groove pattern 12 formed on the second optical member 15 can be arranged with almost no misalignment. Alternatively, when the V-shaped groove has a particular depth, the optical fiber, which is later fixed to the V-shaped groove, can be easily coupled to the optical waveguide.

Figure 3:
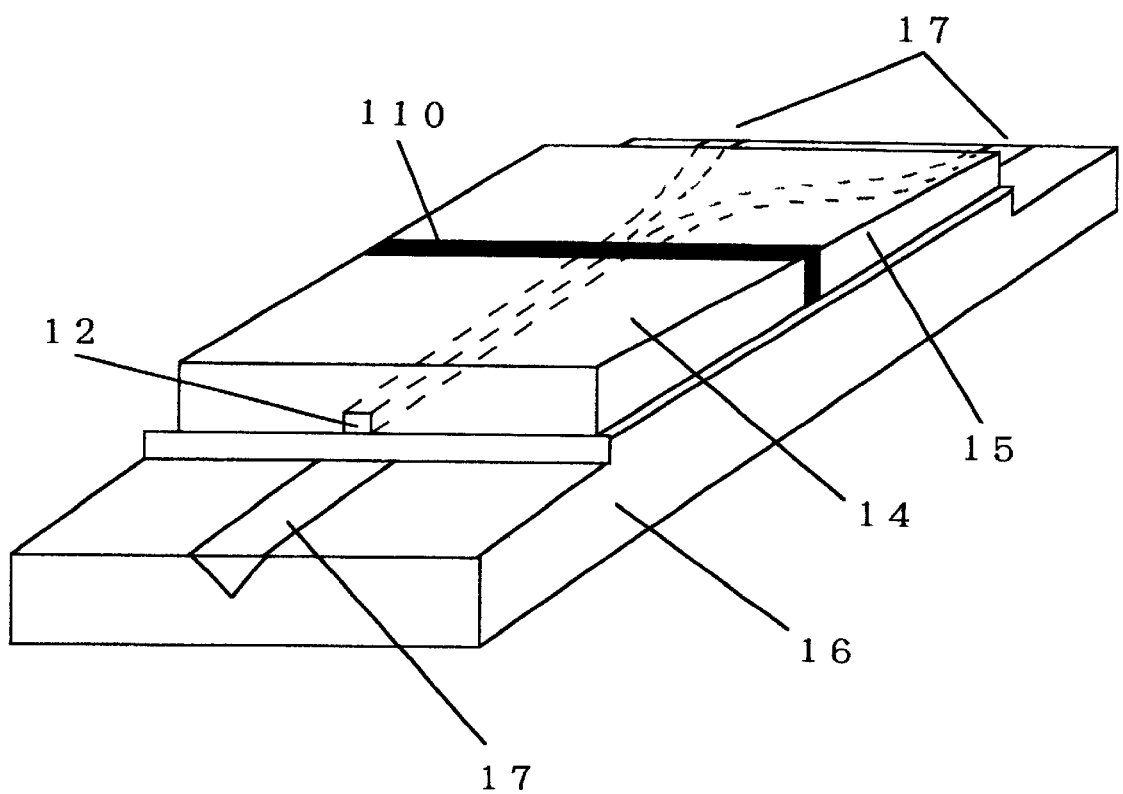
FIG. 3 is a view showing the optical waveguide part according to Embodiment 1 of the present invention.
Figure 6:
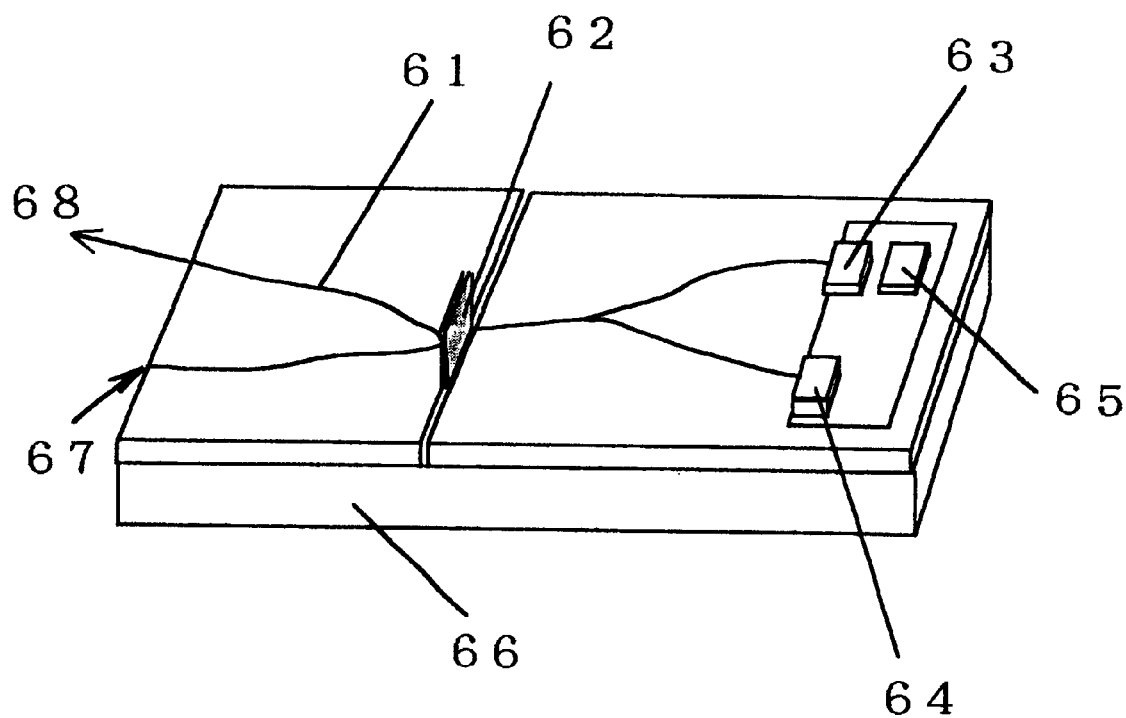
FIG. 6 is a view showing the configuration of a conventional wavelength division multiplexing optical module.
Figure 8:
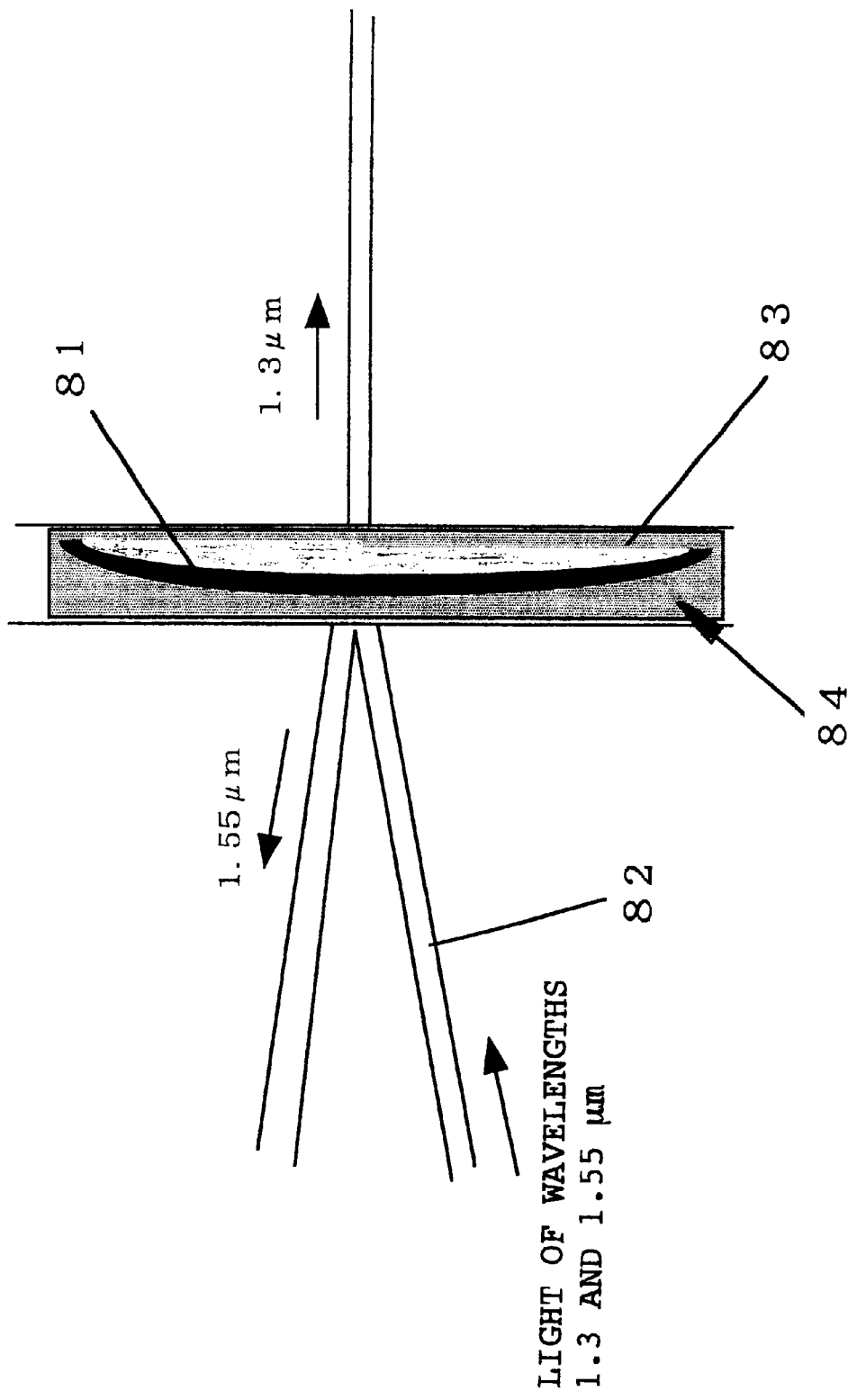
FIG. 8 is a view showing how a wavelength filter is inserted in a groove in the optical module in FIG. 6.

The optical waveguide part shown in FIG. 3 is completed in this manner. FIG. 4 shows that the optical fibers are connected to the V-shaped grove in FIG. 3, as seen from above the module.

For example, a thin-film wavelength filter 43 in FIG. 4 is assumed to transmit light of wavelength 1.3 $\mu$m while reflecting light of wavelength 1.55 $\mu$m. When light having wavelengths of 1.3 and 1.55 $\mu$m is input to an optical fiber 41 from an external source, it is transmitted through an optical waveguide 42 and divided by the thin-film wavelength filter 43. The light of wavelength 1.55 $\mu$m is reflected by the filter, passes through an optical waveguide 44, and leaves this part through a first output fiber 45. On the other hand, the light of wavelength 1.3 $\mu$m passes through the thin-film wavelength filter 43 and leaves this part through a second output fiber 47. That is, the optical waveguide part shown in FIGS. 3 and 4 has a function for separating the light through the optical fiber in wavelength.

The optical waveguide part according to the present invention is very useful in terms of costs and productivity due to its configuration that enables mass production.

This embodiment has been described in connection with the optical waveguide part having the two-branch pattern for the wavelength separation function. The present invention, however, is not limited to this but is applicable to all general optical waveguide patterns.

In addition, in this embodiment, the optical member with the groove-shaped optical waveguide pattern is cut and divided, but different optical members may be separately molded only if individual optical waveguide patterns are continuously connected together.

Additionally, an arbitrary number of optical members may be installed on the base substrate as long as the number is two or more.

Further, an arbitrary number of optical elements may be installed between the optical members as long as the number is one or more.

Further, this embodiment directly coats the optical thin film. Since elements cannot confine light like waveguides, more light may leak to increase losses when the elements are thick. The elements, however, can be made thin by directly forming the optical thin film on the end surface of the optical waveguide; this method is more advantageous in terms of performance. Depending on how coupling losses are tolerated, however, a plate-shaped element such as a wavelength plate or an isolator may be bonded to the end surface of the optical member instead of directly forming thin films. In either way, the optical elements can be integrated more easily than with the conventional method for inserting the optical filter into the groove.

Moreover, this embodiment uses the UV resin as an optical waveguide core material. The present invention, however, is not limited to this but for example, a thermosetting resin may be used.

In addition, in this embodiment, the fiber-fixing groove formed in the base substrate is V-shaped. The present invention, however, is not limited to this but it may have, for example, a rectangular or semi-circular cross section.

Additionally, the alignment markers of the base substrate and each optical member are desirably formed by means of molding as described in this embodiment, in terms of productivity. The present invention, however, is not limited to this but the markers may be obtained by forming recesses and projections using a metal film pattern or etching as required.

Further, alignment markers may be separately provided for mounting optical or electronic part such as light emitting and receiving elements, electrode wires, or semiconductor devices. These markers allow the optical waveguide core and the LD or PD to be accurately aligned to achieve connections with low losses.

Embodiment 2

A method for manufacturing an optical waveguide part according to Embodiment 2 of the present invention will be described.

First, a plurality of optical members are produced using a molding process (FIGS. 5(A) and (B)). Groove-shaped optical waveguide patterns on the plurality of optical members are continuously connected together. The details of this step are similar to those in Embodiment 1 and are thus omitted.

Next, as shown in FIG. 5(c), a first optical member 54 is directly jointed to a base substrate 56, that is, contacted with and fixed to the base substrate 56 on a surface with a groove-shaped optical waveguide pattern 52 formed thereon. In this case, alignment is carried out using alignment markers 53 and 59 produced by means of molding as in Embodiment 1.

To directly couple the base substrate 56 and the optical member 54 together, these components are washed and then thermally treated at high temperature so as to be jointed together; this method can achieve a high coupling strength. The optical member 54 and the base substrate 56 are preferably made of the same material, which is particularly desirably glass but may be any material that enables direct joining and molding.

Next, as shown in FIG. 5(d), the optical waveguide groove 52, which is now hollow after the bonding, is filled with material having a high refractive index than the optical member 54 and the base substrate 56. This material functions as the optical waveguide core;

The filling material is desirably an ultraviolet setting resin or thermosetting resin that is not so viscous and that can be solidified after the filling. The cavity can be filled with the resin so as to contain no bubble, for example, by using a capillary phenomenon under a reduced pressure.

Subsequently, as shown in FIG. 5(e), a thin-film wavelength filter 511 is directly coated on the end surface of the optical waveguide of the optical member after the resin has hardened.

Alternatively, the need to solidify the filling material is eliminated by sealing the end of the optical waveguide groove with a thin polyimide film. In this case, the configuration of the optical waveguide part according to the present invention can be obtained by coating an optical thin film on the polyimide film for the sealing to form an element.

Finally, as shown in FIG. 5(f), a second optical member 55 is bonded to the base substrate 56 similarly to the first optical member and the optical waveguide groove 52 is filled with a material of a high refractive index to complete the optical waveguide part.

The second optical member can also be accurately positioned on the base substrate by using alignment markers formed by means of molding.

Thus, the optical waveguide groove pattern formed on the first optical member and the optical waveguide groove pattern formed on the second optical member can be arranged with almost no misalignment. Alternatively, when the V-shaped groove has a particular depth, the optical fiber, which is later fixed to the V-shaped groove, can be easily coupled to the optical waveguide.

The optical waveguide part shown in FIG. 3 is completed in this manner. The configuration and functions of this optical waveguide part are the same as those described in Embodiment 1 and are thus omitted.

According to the method for manufacturing the optical waveguide part according to Embodiment 2, the direct coupling is used to firmly bond the optical member and the base substrate together, thereby substantially increasing mechanical strength.

Embodiment 3

Next, another embodiment of the present invention will be explained. A part denoted by the same reference numerals designates like part.

Figure 9:
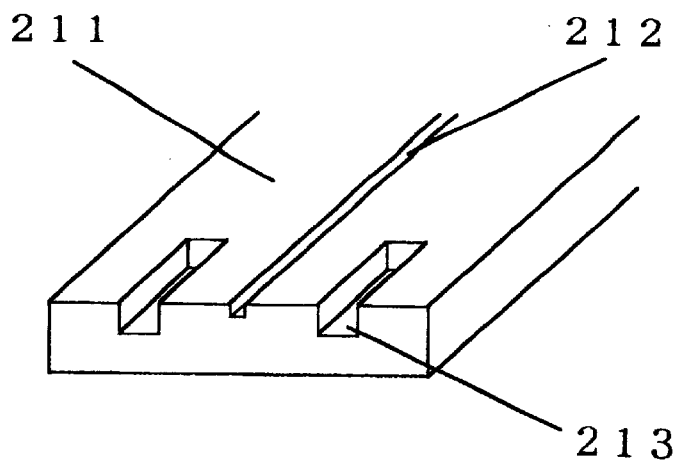
FIGS. 9a–9b are views showing an optical waveguide part according to Embodiment 3 of the present invention.
Figure 9:
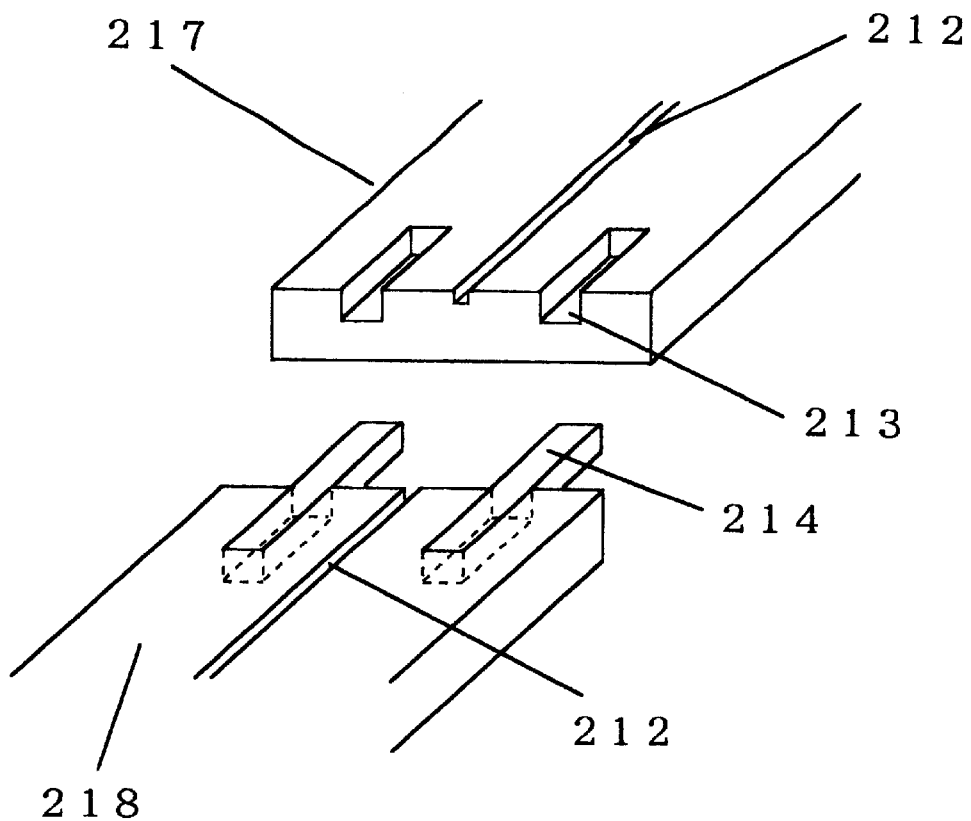

FIG. 9 is a view useful in explaining the configuration and connection of an optical waveguide part according to Embodiment 3 of the present invention.

As shown in FIG. 9(A), molding is first carried out with a mold (not shown) to form a groove-shaped optical waveguide groove 212 and recesses 213 for connection in a surface of a first substrate 211 made of glass or a transparent resin, thereby producing a first optical waveguide part 217. A second optical waveguide part 218 is similarly produced.

Next, as shown in FIG. 9(B), the first optical waveguide part 217 and the second optical waveguide part 218 are connected together. The second optical waveguide part 218 is positioned by installing pins 214 in the recesses for connection formed by means of molding and inserting the second optical waveguide part 218 into the first optical waveguide part 217 for fixation. At this point, the part can be accurately positioned because the recesses and the optical waveguide groove 212 in the first optical waveguide part 217 are relatively located at the same positions as those in the second optical waveguide part 218.

Thus, the optical waveguide groove 212 formed on the first optical waveguide part 217 and the optical waveguide groove 212 formed on the second optical waveguide part 218 can be connected with almost no misalignment. Finally, a UV resin is coated on the optical-waveguide-groove-formed surfaces of the first and second optical waveguide parts 217 and 218 to fill the groove, and the parts are irradiated with an ultraviolet ray to harden the UV resin in the groove. When the UV resin has a higher refractive index than the first and second optical waveguide parts 217 and 218, the UV resin in the groove functions as the optical waveguide core.

In this embodiment, the material of the optical waveguide core is the UV resin. The present invention, however, is not limited to this but the material may be, for example, a thermosetting resin. In addition, the recesses for connection in the substrates are desirably formed by means of molding as described in this embodiment, in terms of productivity. The present invention, however, is not limited to this but the recesses may be formed by means of etching as required.

Additionally, although this embodiment uses the pins for connection, the present invention is not limited to this but the second optical waveguide part has only to have projections for connection. Even if the pins are used, the recesses in the first optical waveguide part may be brought into abutment with the corresponding recesses of the second optical waveguide part, and the pins are fitted in the recesses from above to connect the first and second optical waveguide parts together.

Further, in this embodiment, the recesses for connection are the grooves with a rectangular cross section. The present invention, however, is not limited to this but the recesses may be V-shaped or semi-circular grooves. In addition, in this embodiment, the recesses for connection are formed on the top surface of the substrate. The present invention, however, is not limited to this but the recesses may be formed on another surface.

Figure 15:
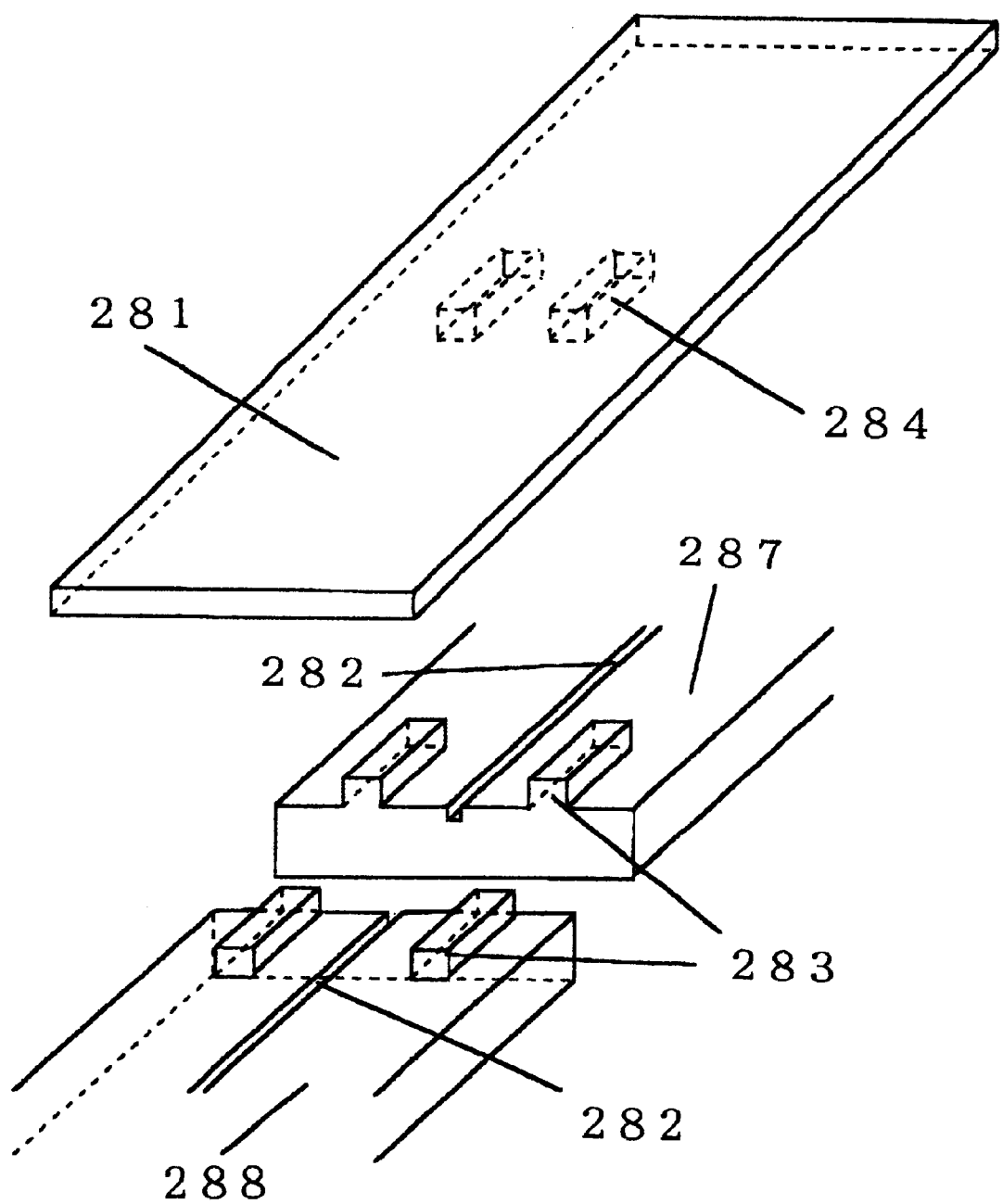
FIG. 15 is a view showing a conventional optical module.

Moreover, although this embodiment forms the recesses in the optical waveguide part, the present invention is not limited to this but projections 283 may be formed on optical waveguide parts 287 and 288 for connection, as shown in FIG. 15. In this case, a plate-shaped connection member (substrate) 281 having recesses 84 is used to connect the two optical waveguide parts 287 and 288 together in order to fit the recesses on the projections 283 formed on the two optical waveguide parts 287 and 288.

In addition, in this embodiment, the recesses are shorter than the substrate. The present invention, however, is not limited to this but the recesses are as long as the substrate.

Embodiment 4

Figure 10:
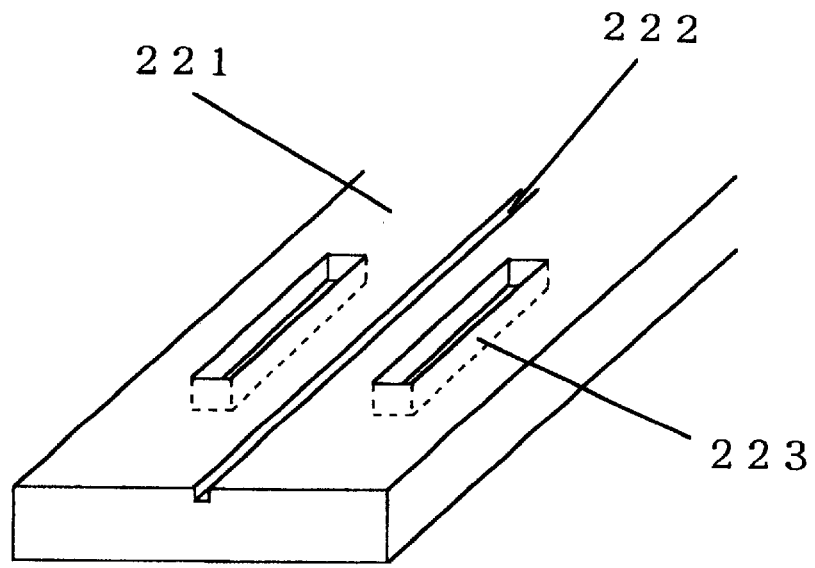
FIGS. 10a–10b are views showing an optical waveguide part according to Embodiment 4 of the present invention.
Figure 10:
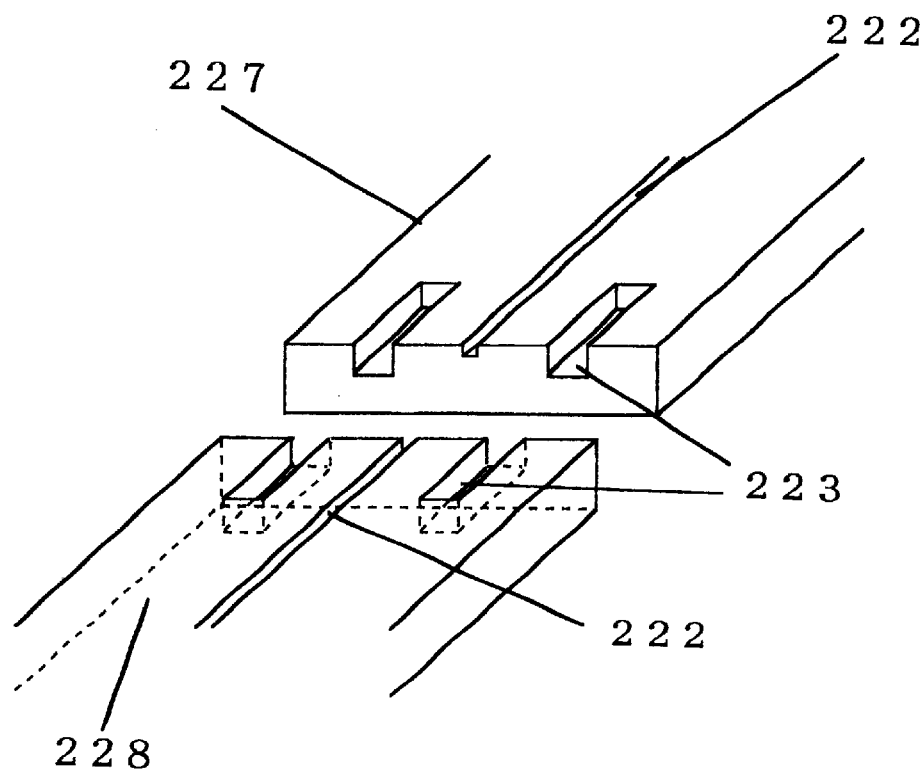

FIG. 10 is a view useful in explaining a method for manufacturing an optical waveguide part according to Embodiment 4 of the present invention.

As shown in FIG. 10(A), molding is first carried out with a mold (not shown) to form an optical waveguide groove 222 and recesses 223 for connection in a surface of a first substrate 221 made of glass or a transparent resin, thereby producing an optical waveguide part. Then, the substrate is cut in a fashion traversing the optical waveguide groove 222 and recesses 223 as shown in FIG. 10(B). Thus, the substrate is divided into a first optical waveguide part 227 and a second optical waveguide part 228.

Next, the first optical waveguide part 227 and the second optical waveguide part 228 are connected together. The connection method is the same as that described in Embodiment 3 and is thus omitted. Finally, a UV resin is coated on the optical-waveguide-groove-formed surfaces of the first and second optical waveguide parts 227 and 228 to fill the groove, and the parts are irradiated with an ultraviolet ray to harden the UV resin in the groove. When the UV resin has a higher refractive index than the first and second optical waveguide parts 227 and 228, the UV resin in the groove functions as the optical waveguide core.

Figure 16:
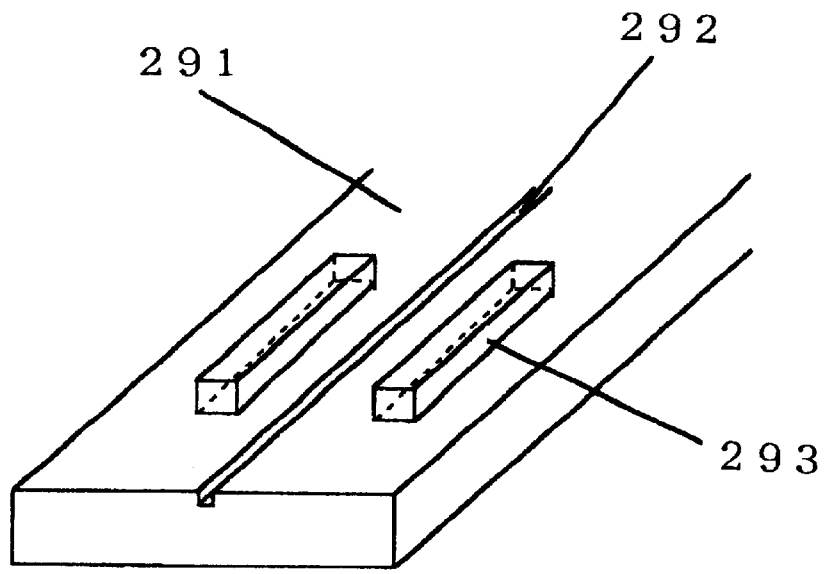
FIGS. 16a–16b are views showing the optical waveguide part according to Embodiment 3 of the present invention.
Figure 16:
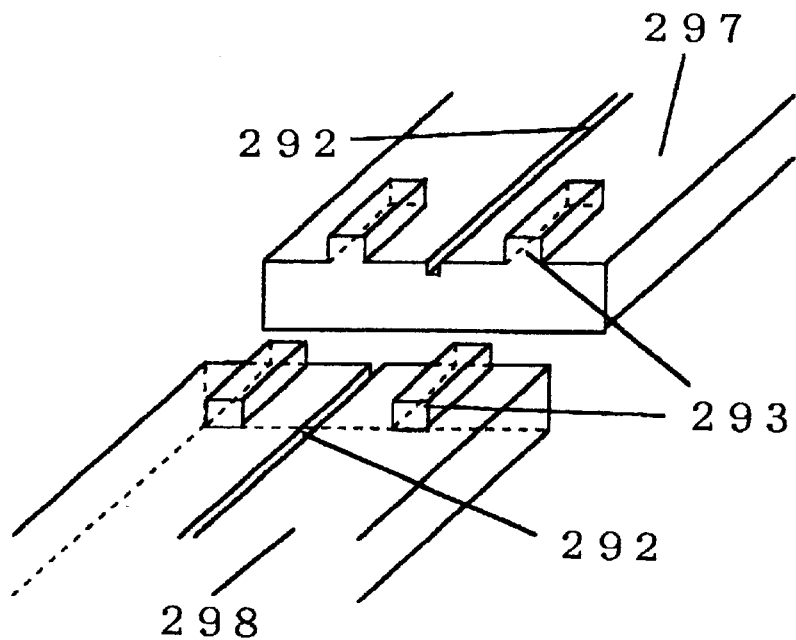
Figure 17:
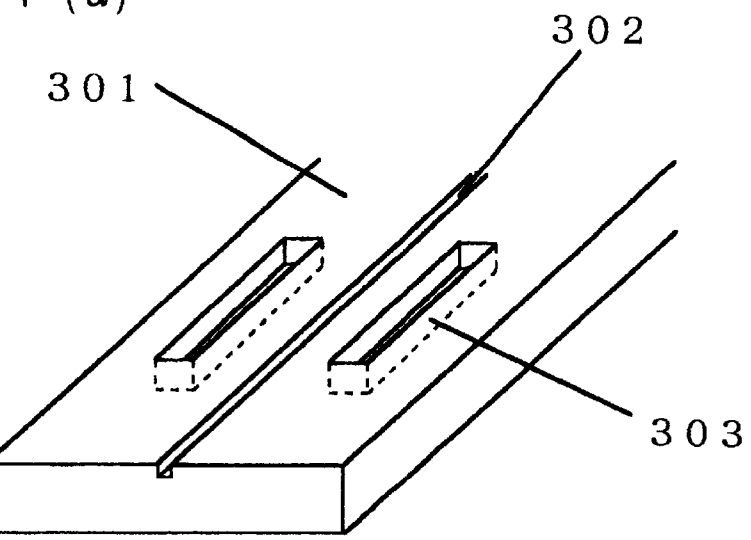
FIGS. 17a–17b are views showing the optical waveguide part according to Embodiment 4 of the present invention.
Figure 17:
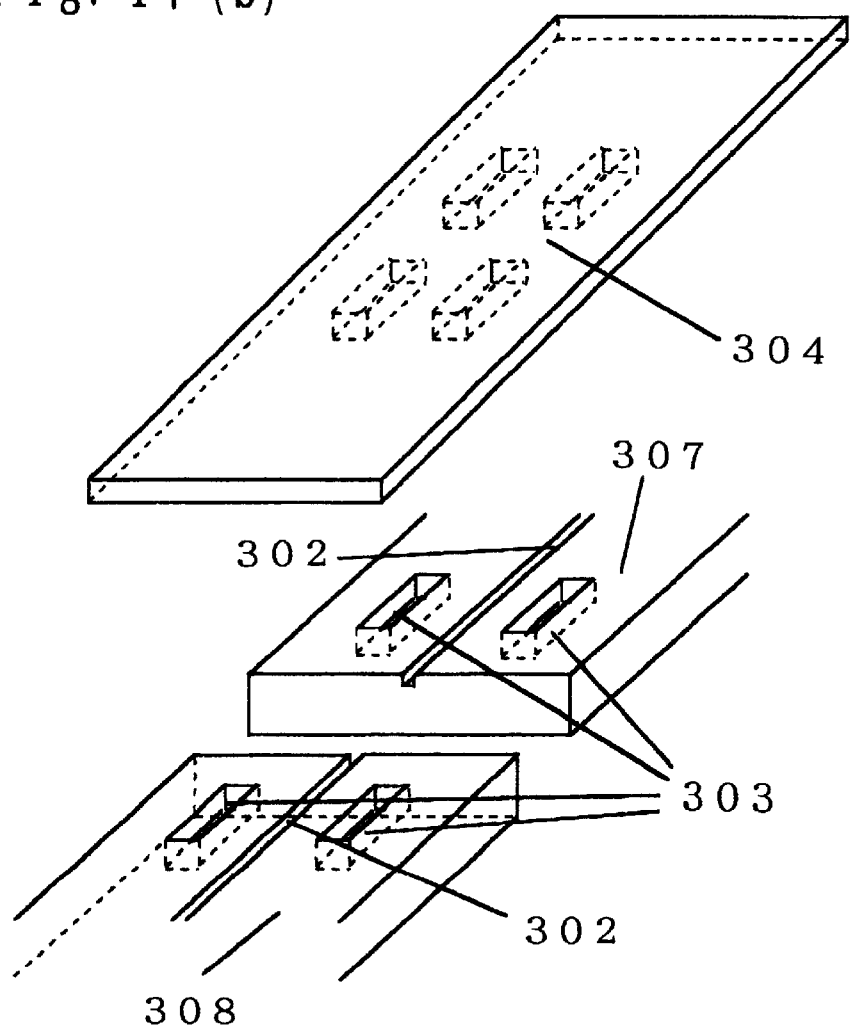

The above described Embodiment 4 shows the example in which the substrate 221 with the recesses 223 formed therein as shown in FIG. 10(A) is cut to produce the two optical waveguide parts. However, instead of the recesses 223, as shown in FIG. 16(A), a substrate 291 with projections 293 formed therein may be cut to produce two optical waveguide parts 297 and 298.

Further, the above described Embodiment 4 shows, as shown in FIG. 10(A), the example in which the substrate 221 is cut to produce the two optical waveguide parts. However, two substrates 301 (307 and 308) with recesses 303 formed therein may be provided with a connection member comprising a plate with projections 304 formed thereon which fit in the recesses 303 formed in the two optical waveguide parts 307 and 308 to connect these optical waveguide parts together when these parts are brought into mutual contact so that the connection member can be used to connect the two substrates with the recesses 303 formed therein.

Likewise, two substrates with projections formed thereon instead of the recesses 303 may be provided with a connection member comprising a plate with recesses formed therein which fit on the projections formed on the two optical waveguide parts to connect these optical waveguide parts together when these parts are brought into mutual contact so that the connection member can be used to connect the two substrates with the projections formed therein.

Embodiment 5

Figure 11:
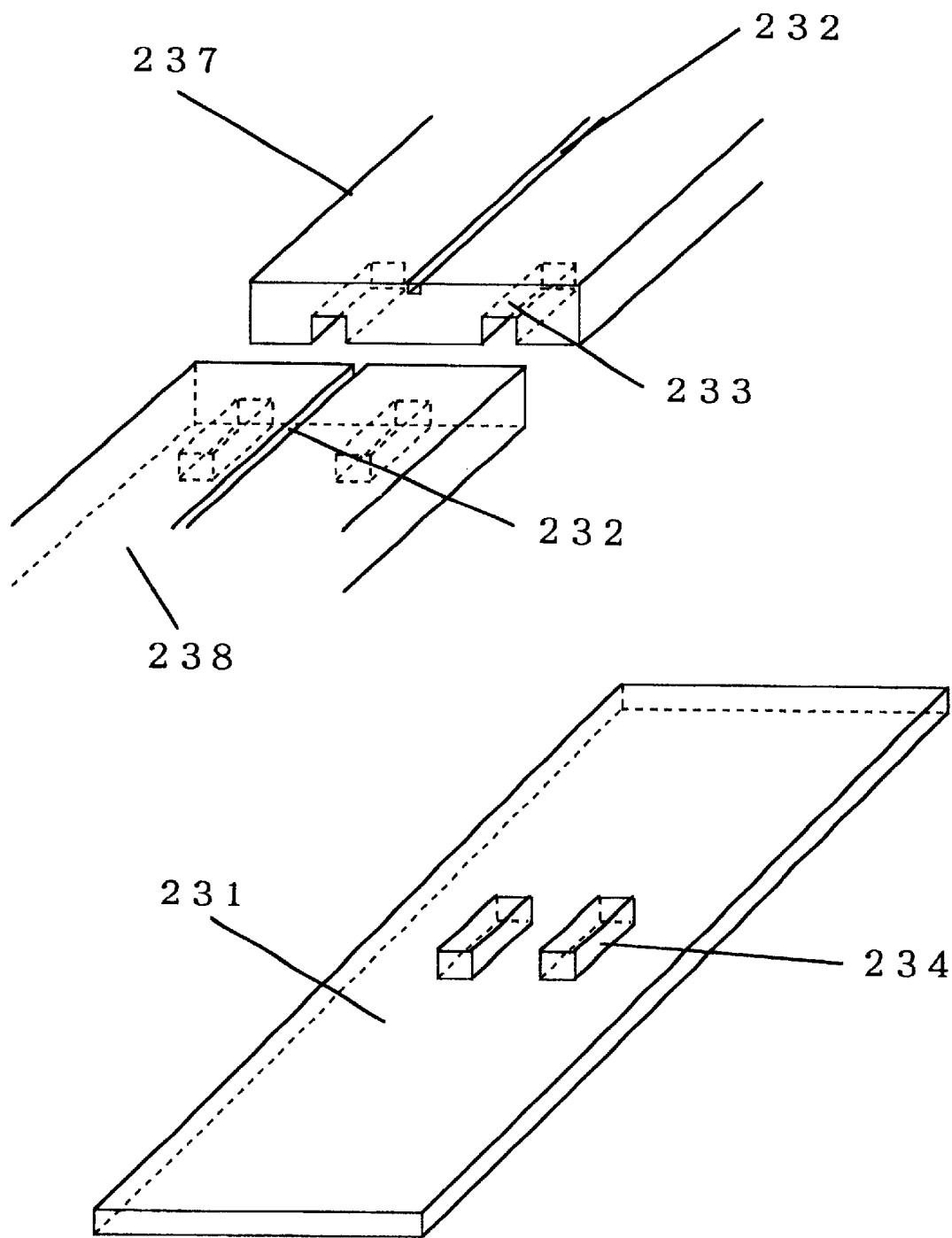
FIG. 11 is a view showing an optical waveguide part according to Embodiment 5 of the present invention.

FIG. 11 shows an optical waveguide part and a connection member according to Embodiment 5 of the present invention.

Molding is first carried out with a mold (not shown) to form an optical waveguide. groove 232 and recesses 233 for connection in a surface of a first substrate made of glass or a transparent resin, thereby producing a first optical waveguide part 237. A second optical waveguide part 238 is similarly produced.

Then, the first optical waveguide part 237 and the second optical waveguide part 238 are connected together. The optical waveguide part can be accurately positioned by separately providing a substrate 231 with projections 234 on its surface and aligning the recesses 233 for connection with the projections 234 for fixation. Thus, the optical waveguide groove 232 formed on the first optical waveguide part 237 and the optical waveguide groove 232 formed on the second optical waveguide part 238 can be connected together with almost no misalignment.

In this embodiment, the recesses for connection are formed on the bottom surface of the substrate. The present invention, however, is not limited to this but the recesses may be formed on another surface. The formation of the recesses for connection on the bottom (rear) surface of the substrate, however, has the advantage of allowing an easy connection when inserting another optical element between the optical waveguide parts.

Further, in this embodiment, the recesses for connection are the grooves with a rectangular cross section. The present invention, however, is not limited to this but the recesses may be V-shaped or semi-circular grooves. Moreover, in this embodiment, the recesses are formed in the optical waveguide part. The present invention, however, is not limited to this, but projections may be formed on the optical waveguide part, while the connection member comprises a substrate with recesses in a surface thereof. The substrate for connection may also be formed by means of molding. In addition, in this embodiment, the recesses and projections are shorter than the substrate. The present invention, however, is not limited to this but the recesses and projections are as long as the substrate.

Embodiment 6

Figure 12:
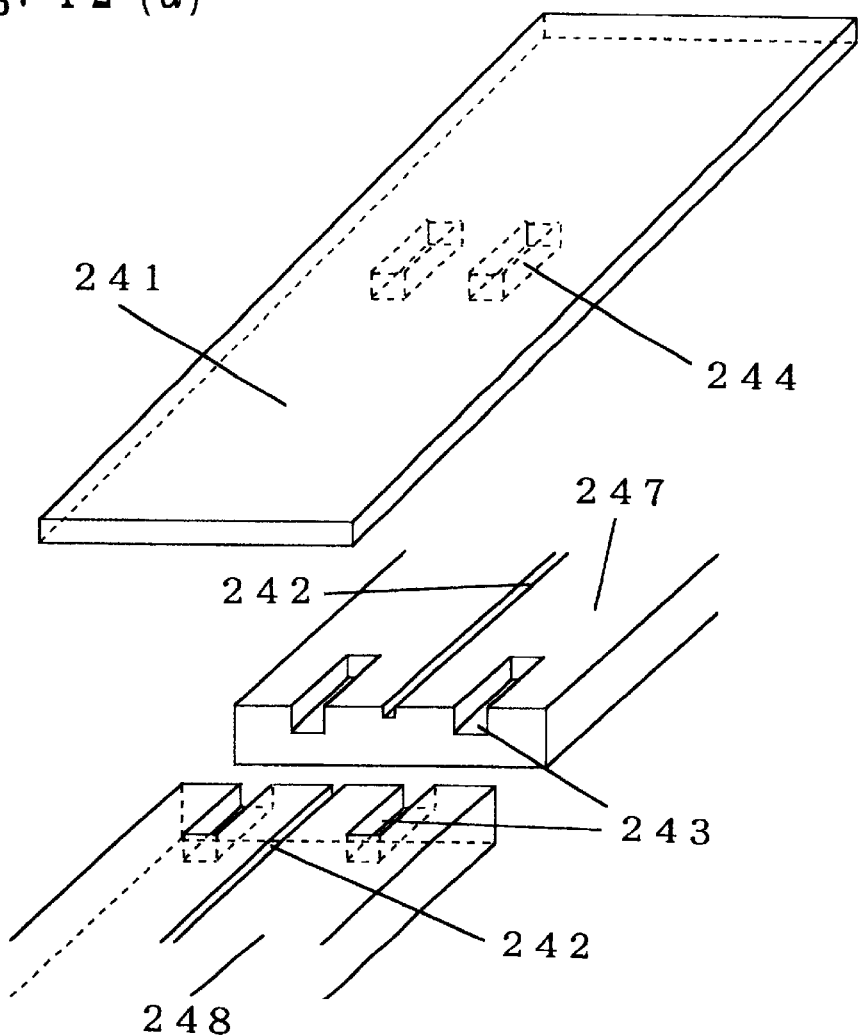
FIGS. 12a–12b are views showing an optical waveguide part according to Embodiment 6 of the present invention.
Figure 12:
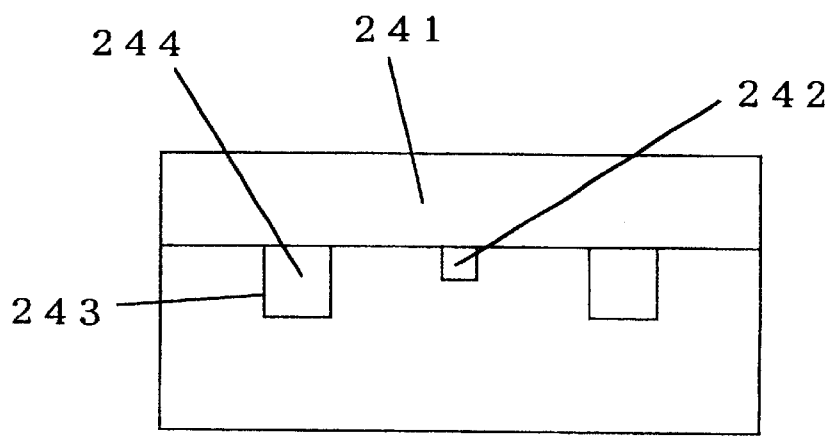

FIG. 12 shows an optical waveguide part and a connection member according to Embodiment 6 of the present invention.

As shown in FIG. 12(A) molding is first carried out with a mold (not shown) to form an optical waveguide groove 242 and recesses 243 for connection in that surface of a substrate made of glass or a transparent resin which has the optical waveguide 242 formed therein, thereby producing a first optical waveguide part 247. A second optical waveguide part 248 is similarly produced. Then, a UV resin is coated on the optical-waveguide-groove-formed surfaces of the first and second optical waveguide parts 247 and 248 to fill the groove.

Next, the first optical waveguide part 247 and the second optical waveguide part 248 are connected together. The optical waveguide part can be accurately positioned by separately providing a substrate 241 with projections 244 on its surface and aligning the recesses for connection 243 with the projections 244 for fixation. Thus, the optical waveguide groove 242 formed on the first optical waveguide part 247 and the optical waveguide groove 242 formed on the second optical waveguide part 248 can be connected together with almost no misalignment.

These parts are irradiated with an ultraviolet ray to harden the UV resin in the groove. When the UV resin has a higher refractive index than the first and second optical waveguide parts 247 and 248 and than the substrate 241 with the projections 244 on its surface, the UV resin in the groove functions as the optical waveguide core. In this case, the substrate 241 with the projections 244 on its surface functions as an upper clad, as shown in FIG. 12(B).

In this embodiment, the recesses for connection are the grooves with a rectangular cross section. The present invention, however, is not limited to this but the recesses may be V-shaped or semi-circular grooves. Moreover, in this embodiment, the recesses are formed in the optical waveguide part. The present invention, however, is not limited to this, but projections may be formed on the optical waveguide part, while the connection member comprises a substrate with recesses in a surface thereof. The substrate for connection may also be formed by means of molding. In addition, in this embodiment, the recesses and projections are shorter than the substrate. The present invention, however, is not limited to this but the recesses and projections are as long as the substrate.

Embodiment 7

Figure 13:
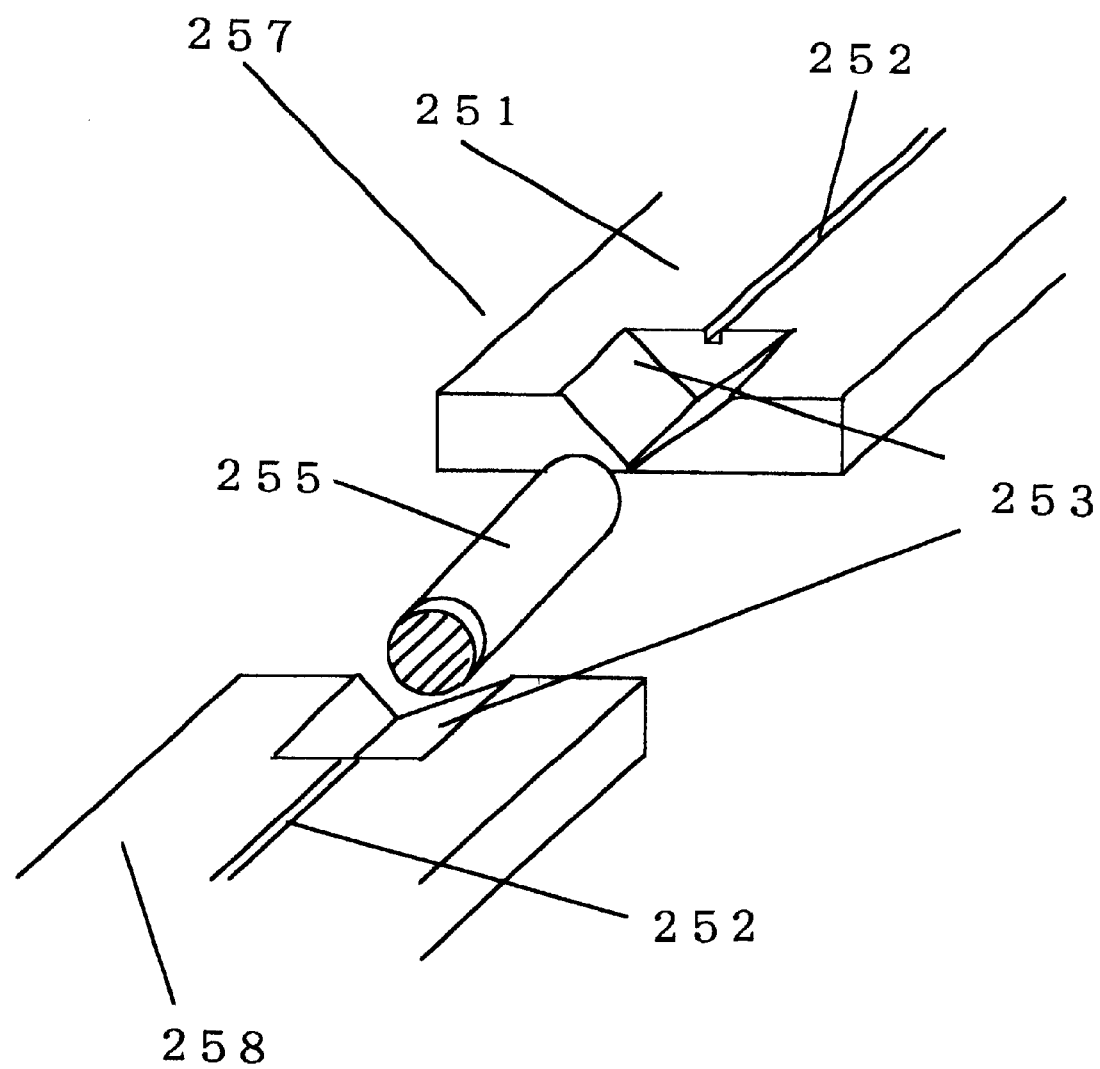
FIG. 13 is a view showing an optical waveguide part according to Embodiment 7 of the present invention.

FIG. 13 is a view useful in explaining an optical waveguide part and a connection member according to Embodiment 7 of the present invention.

Molding is first carried out with a mold (not shown) to form an optical waveguide groove 252 and a recess 253 for connection in a surface of a first substrate 251 made of glass or a transparent resin, thereby producing a first optical waveguide part 257. A recess 253 for connection with an optical waveguide groove 252 is similarly formed in a surface of a second substrate to produce a second optical waveguide part 258. The recess 253 is on an extension of the optical waveguide groove 252 and is formed at an end surface of the substrate.

Next, the first optical waveguide part 257 and the second optical waveguide part 258 are connected together. The optical waveguide part can be accurately positioned by installing an optical part 255, for example, an optical fiber in the recess for connection 253 in the second optical waveguide part 258 and inserting the other end of the optical part 255 into the recess 253 of the first waveguide part 257. Thus, the optical waveguide groove 252 formed on the first optical waveguide part 257 and the optical waveguide groove 252 formed on the second optical waveguide part 258 can be connected together with almost no misalignment.

In addition, although this embodiment uses the optical fiber as the optical part, a ferrule may be used instead as long as its outer dimensions are accurate.

Embodiment 8

Figure 14:
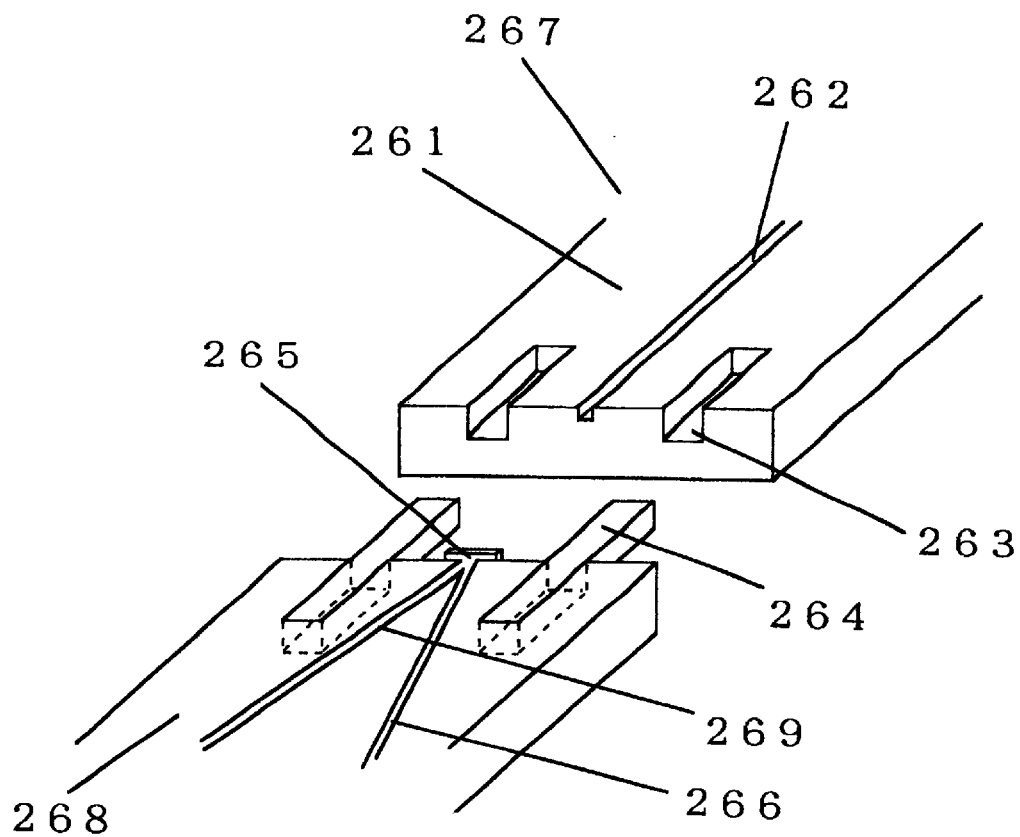
FIGS. 14a–14b are views showing an optical waveguide part according to Embodiment 8 of the present invention.
Figure 14:
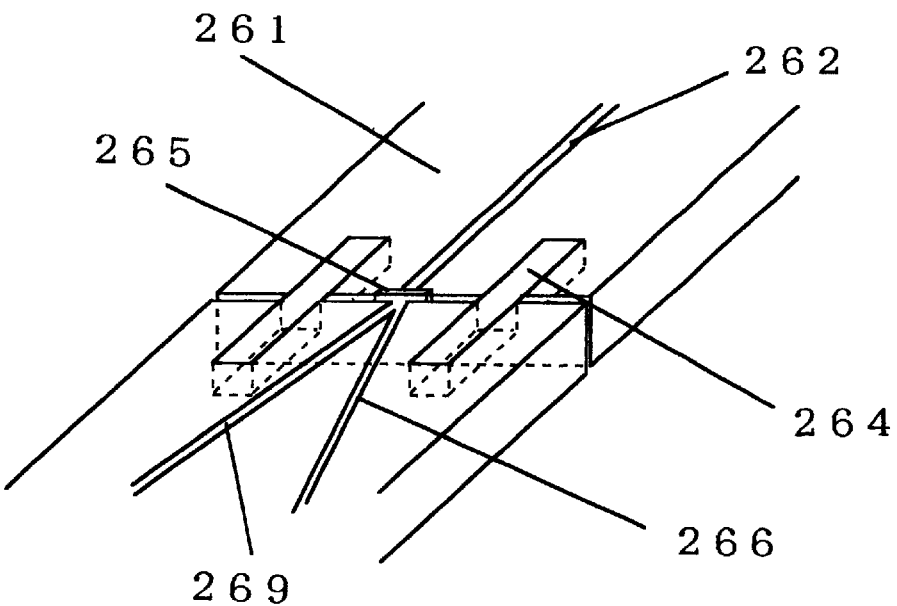

FIG. 14 is a view useful in explaining the configuration and connection of an optical waveguide part according to Embodiment 8 of the present invention.

Molding is first carried out with a mold (not shown) to form an optical waveguide groove 262 and a recess 263 for connection in a surface of a first substrate 261 made of glass or a transparent resin, thereby producing a first optical waveguide part 267. Optical waveguide grooves 266 and 269 and a recess for connection are similarly formed in a surface of a second substrate to produce a second optical waveguide part 268.

Next, as shown in FIG. 14(A), a thin-film formation process is used to form an optical thin film such as a thin-film wavelength filter 265 or a reflection mirror on an end surface of a first optical member 267. The film material may be metal but a dielectric material such as $TiO_2$ or $SiO_2$ is preferably formed into multiple layers because the resulting transmission loss is small. In addition, the thin-film formation process is desirably evaporation, which does not damage the UV resin. Ion assist evaporation is particularly desirable because it can form reliable optical thin films with excellent characteristics.

Then, the first optical waveguide part 267 and the second optical waveguide part 268 are connected together. The connection method is the same as that described in Embodiment 3 and is thus omitted. Finally, a UV resin is coated on the optical-waveguide-groove-formed surfaces of the first and second optical waveguide parts to fill the groove. These parts are subsequently irradiated with an ultraviolet ray to harden the UV resin in the groove. When the UV resin has a higher refractive index than the first and second optical waveguide parts, the UV resin in the groove functions as the optical waveguide core.

An optical element as shown in FIG. 14(B) is completed in this manner.

For example, the thin-film wavelength filter 265 in FIG. 14(B) is assumed to transmit light of wavelength 1.3 $\mu$m while reflecting light of wavelength 1.55 $\mu$m. When light having wavelengths of 1.3 and 1.55 $\mu$m is input to an optical waveguide 266 from an external source, it is transmitted through the optical waveguide 266 and divided by the thin-film wavelength filter 265. The light of wavelength 1.55 $\mu$m is reflected by the filter, passes through the optical waveguide 69 in the opposite direction. On the other hand, the light of wavelength 1.3 $\mu$m passes through the thin-film wavelength filter 265 and then an optical waveguide 262. That is, the optical element shown in FIG. 14(B) has a function for separating the light through the optical fiber in wavelength.

This embodiment has been described in connection with the optical element having the two-branch pattern for the wavelength separation function. The present invention, however, is not limited to this but is applicable to all general optical waveguide patterns. Additionally, in this embodiment, the optical waveguide part is separately molded, but an optical waveguide part with an optical waveguide groove and a recess formed therein may be cut and divided.

In addition, an arbitrary number of an optical waveguide part may be used as long as the number is two or more. An arbitrary number of an optical part may be installed between the optical waveguide parts as long as the number is one or more. Further, this embodiment directly coats the optical thin film. Since the optical part cannot confine light like waveguides, more light may leak to increase losses when the optical part is thick. The optical part, however, can be made thin by directly forming the optical thin film on the end surface of the optical waveguide; this method is more advantageous in terms of performance.

Depending on how coupling losses are tolerated, however, a plate-shaped optical part such as a wavelength plate or an isolator may be bonded to the end surface of the optical waveguide part instead of directly forming thin films. In either way, the optical part can be integrated more easily than with the conventional method for inserting the optical filter into the groove.

In addition, the recesses and projections may be used for alignment for mounting an optical or an electronic part such as light emitting elements and light receiving elements, electrode wires, or semiconductor devices. These recesses and projections allow the optical waveguide core and the LD or PD to be accurately aligned to achieve connections with low losses.

As described in the above embodiments, the optical waveguide part has the configuration that enables mass production and is very useful in terms of costs and productivity.

As described above, the present invention enables inexpensive mass production of an optical module comprising an optical element such as a wavelength filter.

What is claimed is:

1. An optical waveguide part, wherein
   a plurality of optical members each having an optical waveguide groove are installed on a substrate with only a fixing groove, said fixing groove fixing an optical fiber in such a manner that said optical waveguide grooves are connected together in a direction of an optical axis,
   an optical element is located between the plurality of optical members with said optical waveguide groove, and
   a recess of each of said optical waveguide grooves is filled with a material having a higher refractive index than said substrate and said optical member.

2. The optical waveguide part according to claim 1, wherein said substrate comprises a glass-based material or a transparent resin, and the material with which the recess of said optical waveguide groove is filled comprises an ultraviolet setting resin or a thermosetting resin.

3. The optical waveguide part according to claim 1 or 2, wherein said optical element comprises a monolayer or multilayer optical thin film directly formed on an end surface of said optical member.

4. A process for manufacturing an optical waveguide part, comprising:
   a first step of forming on a substrate a fixing groove for fixing an optical fiber and a first, second, . . . n-th (n is an integer of two or larger) optical waveguide grooves on a first, second, . . . n-th optical members, respectively;
   a second step of coating a resin on said first optical member or said substrate, bonding said first optical member to said substrate on a surface thereof with said first optical waveguide groove formed therein, and hardening said resin;
   a third step of additionally forming another optical element on an end surface of said first optical member; and
   a fourth step of coating a resin on said second optical member or said substrate, bonding said second optical member to said substrate on a surface thereof with said second optical waveguide groove formed therein in a manner such that said first and second optical waveguide grooves are connected together, and hardening said resin,
   wherein said third and fourth steps are also carried out on said third, . . . n-th optical members, respectively.

5. A process for manufacturing an optical waveguide part, comprising:
   a first step of forming on a substrate a fixing groove for fixing an optical fiber and a first, second, . . . n-th (n is an integer of two or larger) optical waveguide grooves on a first, second, . . . n-th optical members, respectively;
   a second step of directly joining said first optical member to said substrate on a surface thereof with said first optical waveguide groove formed therein;
   a third step of filling said first optical waveguide groove with a core material;
   a fourth step of additionally forming an optical element on an end surface of said first optical member;
   a fifth step of directly joining said second optical member to said substrate on a surface thereof with said second optical waveguide groove formed therein in a manner such that said first and second optical waveguide grooves are connected together; and
   a sixth step of filling said second optical waveguide groove with a core material,
   wherein said fourth to sixth steps are also carried out on said third, . . . n-th optical members, respectively.

6. The method for manufacturing an optical waveguide part according to claim 4 or 5, wherein said optical element comprises a monolayer or multilayer optical thin film directly formed on an end surface of said optical member.

7. The method for manufacturing an optical waveguide part according to claim 4 or 5, wherein said first step comprises using molding with a mold having recesses or projections on its surface to form said optical waveguide groove on said optical member, and cutting said optical member in such a manner as to traverse said optical waveguide groove to obtain the first, second, . . . n-th optical members and the first, second, . . . n-th optical waveguide grooves.

8. The method for manufacturing an optical waveguide part according to claim 4 or 5, wherein said substrate and said first, second, . . . n-th optical members each comprise alignment markers, and
   said alignment markers are formed by means of molding with a mold having recesses or projections on its surface.

9. An optical waveguide part comprising a first substrate and a second substrate, at least one optical waveguide groove being formed in each said substrate, wherein recesses or projections for positioning are formed on a surface of said first and second substrates at predetermined positions so that said optical waveguide grooves are connectable in a direction of an optical axis.

10. The optical waveguide part according to claim 9, wherein said recesses or projections are formed on a surface of said substrate which does not have said optical waveguide groove formed therein.

11. An optical part for connection together two optical waveguide parts according to claim 9 or 10, wherein:

said two optical waveguide parts each has said recesses formed in a site corresponding to an end surface of said substrate and having said optical waveguide groove formed therein, and said optical part is fitted in said recesses formed in said end surface sections of said two optical waveguide parts.

12. The optical waveguide part according to claim 9 or 10, wherein said optical waveguide groove and said recesses or said projections are formed at one step by using a mold having projections or recesses on its surface.

13. A connection member for use in connecting together two optical waveguide parts according to claim 9 or 10.

14. The connection member according to claim 13, comprising a predetermined plate section having projections or recesses for connection that fit said recesses or projections on each of said two optical waveguide parts.

15. A method for connecting an optical waveguide part, wherein an optical part is used to connect together two optical waveguide parts according to claim 9 or 10 in a manner such that said optical waveguide grooves of said two optical waveguide parts are connected together and wherein:

said two optical waveguide parts each has said recesses formed in a site corresponding to an end surface of said substrate and having said optical waveguide groove formed therein and said optical part is fitted in said recesses formed in said end surface sections of said two optical waveguide parts.

16. A method for connecting an optical waveguide part, wherein a connection member is used to connect together two optical waveguide parts according to claim 9 or 10 in a manner such that said optical waveguide grooves of said two optical waveguide parts are connected together.

17. An optical element comprising two optical waveguide parts according to claim 9 or 10 connected together.

18. The optical element according to claim 17, comprising an optical part located between said optical waveguide grooves of said two optical waveguide parts to optically connect said optical waveguide grooves of said two optical waveguide parts together.

19. The optical element according to claim 17, comprising an optical part located between said optical waveguide grooves of said two optical waveguide parts.

20. A method for manufacturing an optical waveguide part comprising:

providing first and second substrates, each of said substrates having at least an optical waveguide groove; and forming recesses or projections at predetermined positions on an end surface of said substrate so that said optical waveguide grooves are connected in a direction of an optical axis when said recesses and projections are interconnected.

* * * * *

UNITED STATES PATENT AND TRADEMARK OFFICE
CERTIFICATE OF CORRECTION

PATENT NO.     : 6,445,857 B1
DATED          : September 3, 2002
INVENTOR(S)    : Tsuguhiro Korenaga et al.

It is certified that error appears in the above-identified patent and that said Letters Patent is hereby corrected as shown below:

<u>Column 17,</u>
Line 10, change "An optical part for connection" to -- An optical part for connecting --.

<u>Column 17, lines 29-33 to Column 18, lines 1-7,</u>
Claim 15 should read as follows:

--    A method for connecting an optical waveguide part, wherein an optical part is used to connect together two optical waveguide parts according to claim 9 or 10 in a manner such that said optical waveguide grooves of said two optical waveguide parts are connected together and wherein:
        said two optical waveguide parts each has said recesses formed in a site corresponding to an end surface of said substrate and having said optical waveguide groove formed therein, and
        said optical part is fitted in said recesses formed in said end surface sections of said two optical waveguide parts. --

Signed and Sealed this

Twenty-eighth Day of January, 2003

JAMES E. ROGAN
*Director of the United States Patent and Trademark Office*